US010410057B2

(12) United States Patent
Whang et al.

(10) Patent No.: US 10,410,057 B2
(45) Date of Patent: Sep. 10, 2019

(54) CO-MOVEMENT-BASED AUTOMATIC CATEGORIZATION SYSTEM USING LIFE-LOGGING DATA AND METHOD THEREOF

(71) Applicant: Sangmyung University Industry-Academy Cooperation Foundation, Seoul (KR)

(72) Inventors: Mincheol Whang, Goyang-si (KR); Youngho Jo, Namyangju-si (KR); Heajin Kim, Seoul (KR); Jincheol Woo, Seoul (KR)

(73) Assignee: Sangmyung University Industry-Academy Cooperation Foundation, Seoul (KR)

( * ) Notice: Subject to any disclaimer, the term of this patent is extended or adjusted under 35 U.S.C. 154(b) by 298 days.

(21) Appl. No.: 15/431,792

(22) Filed: Feb. 14, 2017

(65) Prior Publication Data
US 2017/0293801 A1    Oct. 12, 2017

(30) Foreign Application Priority Data
Apr. 6, 2016    (KR) .................. 10-2016-0042373

(51) Int. Cl.
*G06K 9/00* (2006.01)
*G06Q 50/00* (2012.01)
(Continued)

(52) U.S. Cl.
CPC ....... *G06K 9/00677* (2013.01); *G06K 9/0061* (2013.01); *G06K 9/00302* (2013.01);
(Continued)

(58) Field of Classification Search
CPC ........... G06K 9/00221; G06K 9/00261; G06K 9/00302; G06K 9/00308; G06K 9/00315;
(Continued)

(56) References Cited

U.S. PATENT DOCUMENTS

| 7,688,349 B2 * | 3/2010 | Flickner | G06K 9/6212 |
| | | | 348/150 |
| 8,244,537 B2 * | 8/2012 | Kondo | H04N 7/163 |
| | | | 704/200 |

(Continued)

FOREIGN PATENT DOCUMENTS

KR    10-1262922 B1    5/2013

OTHER PUBLICATIONS

Nick Campbell, "An Audio-Visual Approach to Measuring Discourse Synchrony in Multimodal Conversation Data", Interspeech, 2009, pp. 2159-2162. (Year: 2009).*

(Continued)

*Primary Examiner* — Eric Rush
(74) *Attorney, Agent, or Firm* — Revolution IP, PLLC

(57) ABSTRACT

Provided is a co-movement-based automatic categorization method, which includes: receiving image data created by photographing a plurality of subjects; detecting movement data including information on subjects' behaviors from the image data; determining whether or not co-movement between the subjects has been done during each predetermined time interval, and generating co-movement clusters in synchronized time sections, and non-co-movement clusters in desynchronized time sections depending on results of determination; if the duration time of a co-movement cluster is shorter than a standard co-movement duration time, converting the co-movement cluster to a non-co-movement cluster; categorizing the co-movement clusters by grouping a plurality of co-movement clusters existing in the same timeslot into one group; and forming a social network with a co-movement cluster group or a single co-movement cluster, and issuing a social identification to the social network.

16 Claims, 8 Drawing Sheets

(51) Int. Cl.
*G06T 7/20* (2017.01)
*G06K 9/62* (2006.01)
(52) U.S. Cl.
CPC ..... *G06K 9/00315* (2013.01); *G06K 9/00335* (2013.01); *G06K 9/00536* (2013.01); *G06K 9/6201* (2013.01); *G06K 9/6224* (2013.01); *G06K 9/6267* (2013.01); *G06Q 50/01* (2013.01); *G06T 7/20* (2013.01)
(58) Field of Classification Search
CPC .......... G06K 9/00335; G06K 9/00496; G06K 9/00536; G06K 9/0061; G06K 9/00624; G06K 9/00677; G06K 9/00711; G06K 9/6201; G06K 9/6224; G06K 9/6267; G06T 7/20; G06Q 30/06; G06Q 30/0613; G06Q 50/00; G06Q 50/01; G06Q 50/30
USPC ....... 382/100, 107, 115, 159, 160, 224, 225, 382/325; 705/319
See application file for complete search history.

(56) References Cited

U.S. PATENT DOCUMENTS

| | | | | |
|---|---|---|---|---|
| 8,539,359 | B2* | 9/2013 | Rapaport | G06Q 30/02 715/751 |
| 9,811,535 | B1* | 11/2017 | Johnson | G06K 9/00221 |
| 2009/0092283 | A1* | 4/2009 | Whillock | G06K 9/00771 382/103 |
| 2011/0131144 | A1* | 6/2011 | Ashour | G06Q 50/01 705/319 |
| 2011/0137907 | A1* | 6/2011 | Ikenoue | G06F 16/29 707/740 |
| 2011/0144452 | A1* | 6/2011 | Shin | A61B 5/165 600/300 |
| 2014/0250126 | A1* | 9/2014 | Baldwin | G06F 16/51 707/737 |
| 2014/0270483 | A1* | 9/2014 | Lucey | G06K 9/00677 382/154 |
| 2017/0161554 | A9* | 6/2017 | Hong | G06K 9/00335 |

OTHER PUBLICATIONS

Emilie Delaherche, Mohamed Chetouani, Ammar Mandhaoui, Catherine Saint-Georges, Sylvie Viaux, and David Cohen, "Interpersonal Synchrony: A Survey of Evaluation Methods across Disciplines", IEEE Transactions on Affective Computing, vol. 3, No. 3, 2012, pp. 349-365. (Year: 2012).*

Chika Nagaoka and Masashi Komori, "Body Movement Synchrony in Psychotherapeutic Counseling: A Study Using the Video-Based Quantification Method", IEICE, Transactions on Information and Systems, vol. E91-D, No. 6, Jun. 2008, pp. 1634 1640 (Year: 2008).*

* cited by examiner

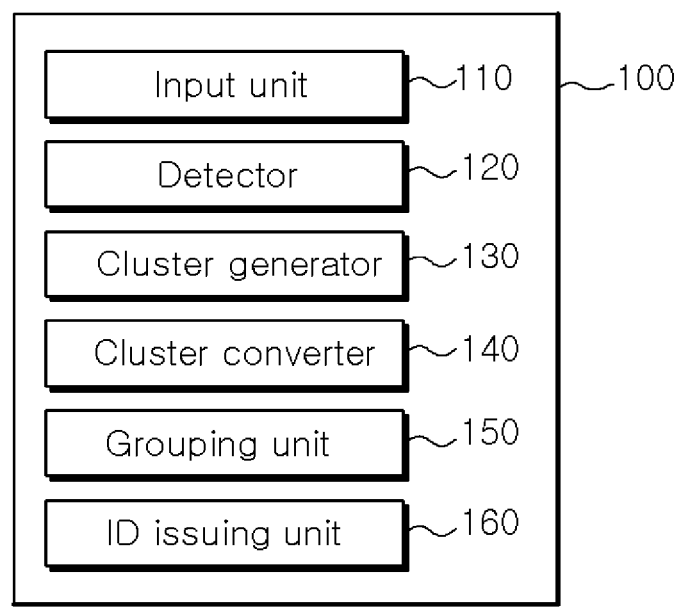
<FIG. 1>

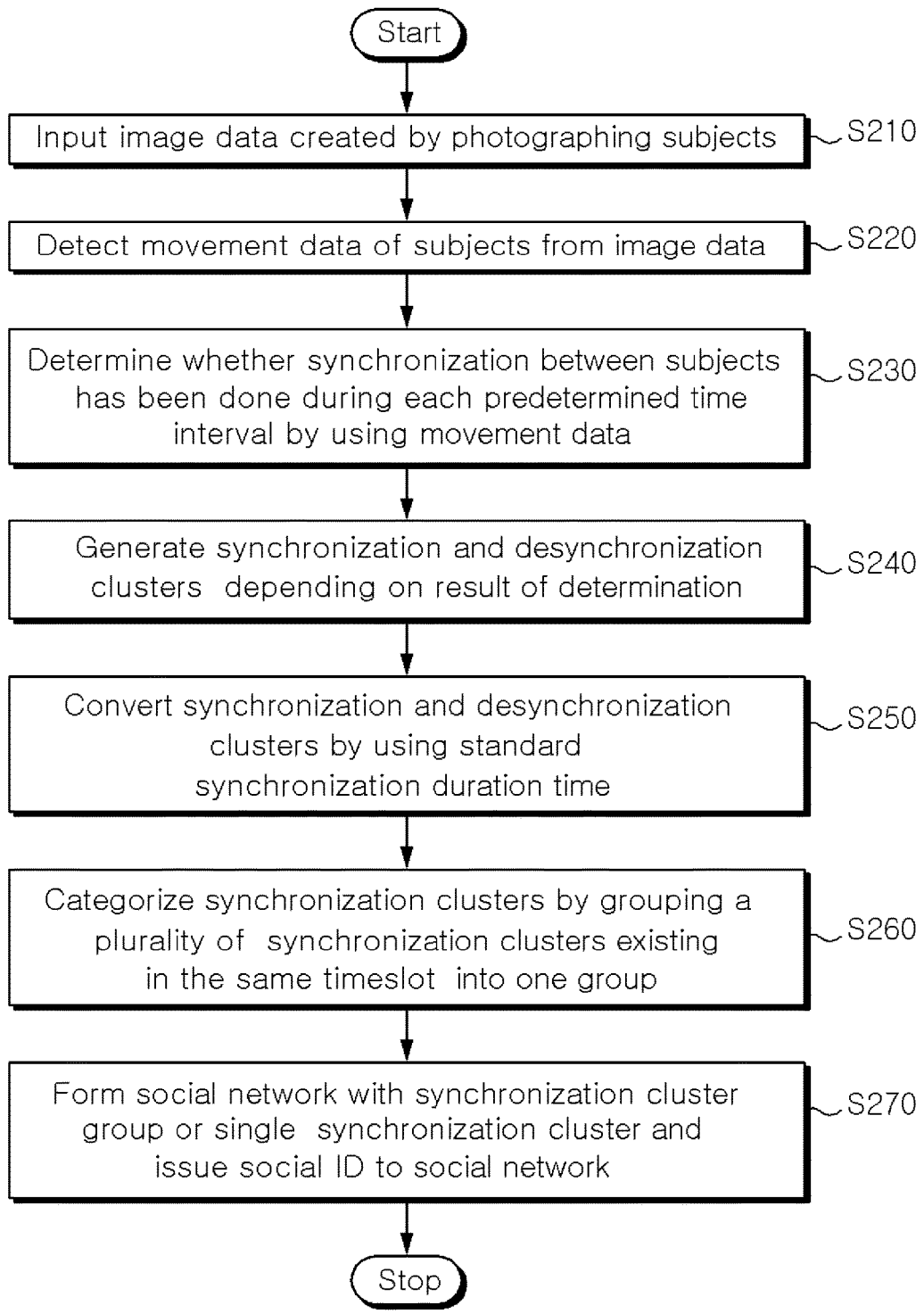

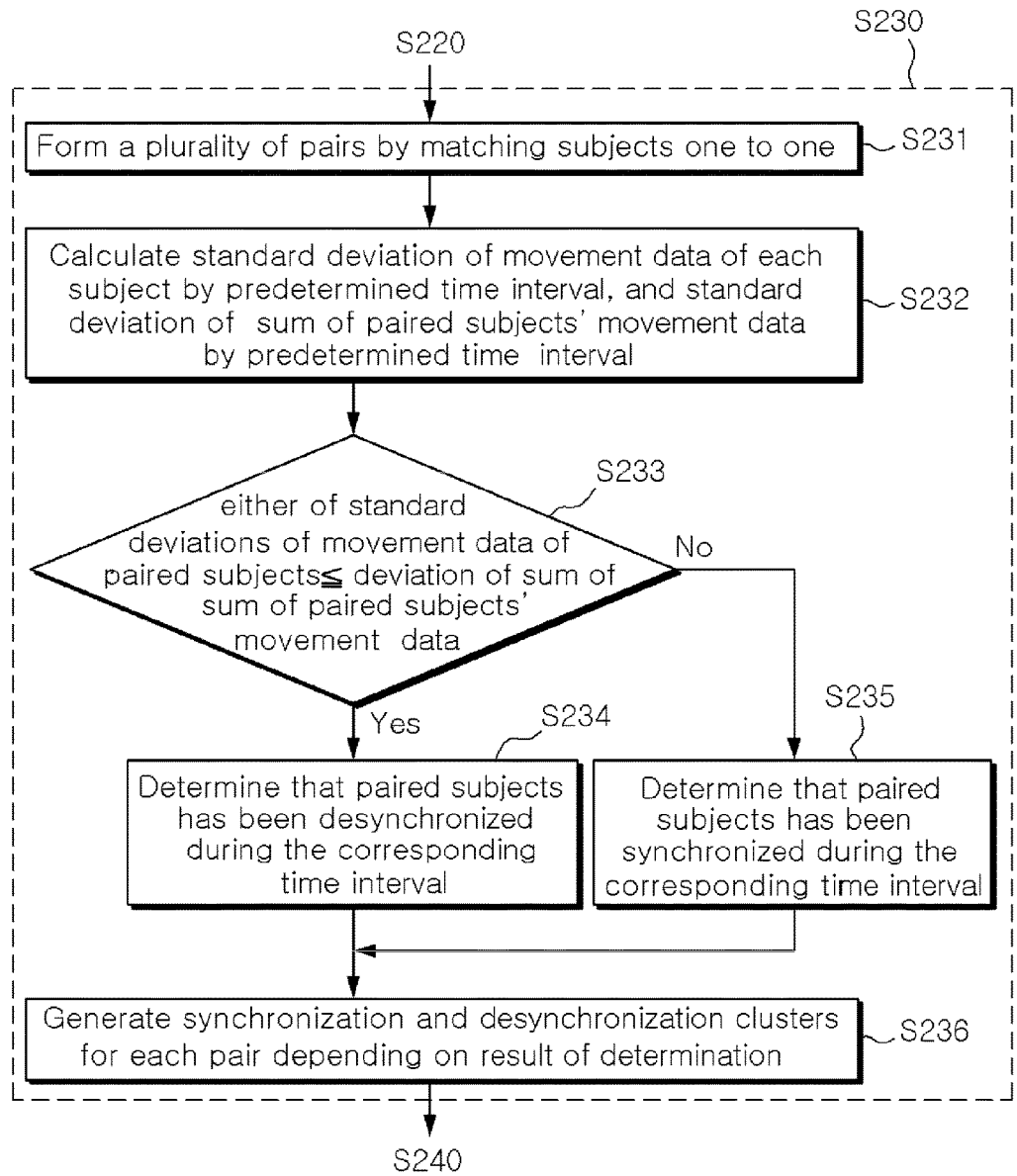
<FIG. 3>

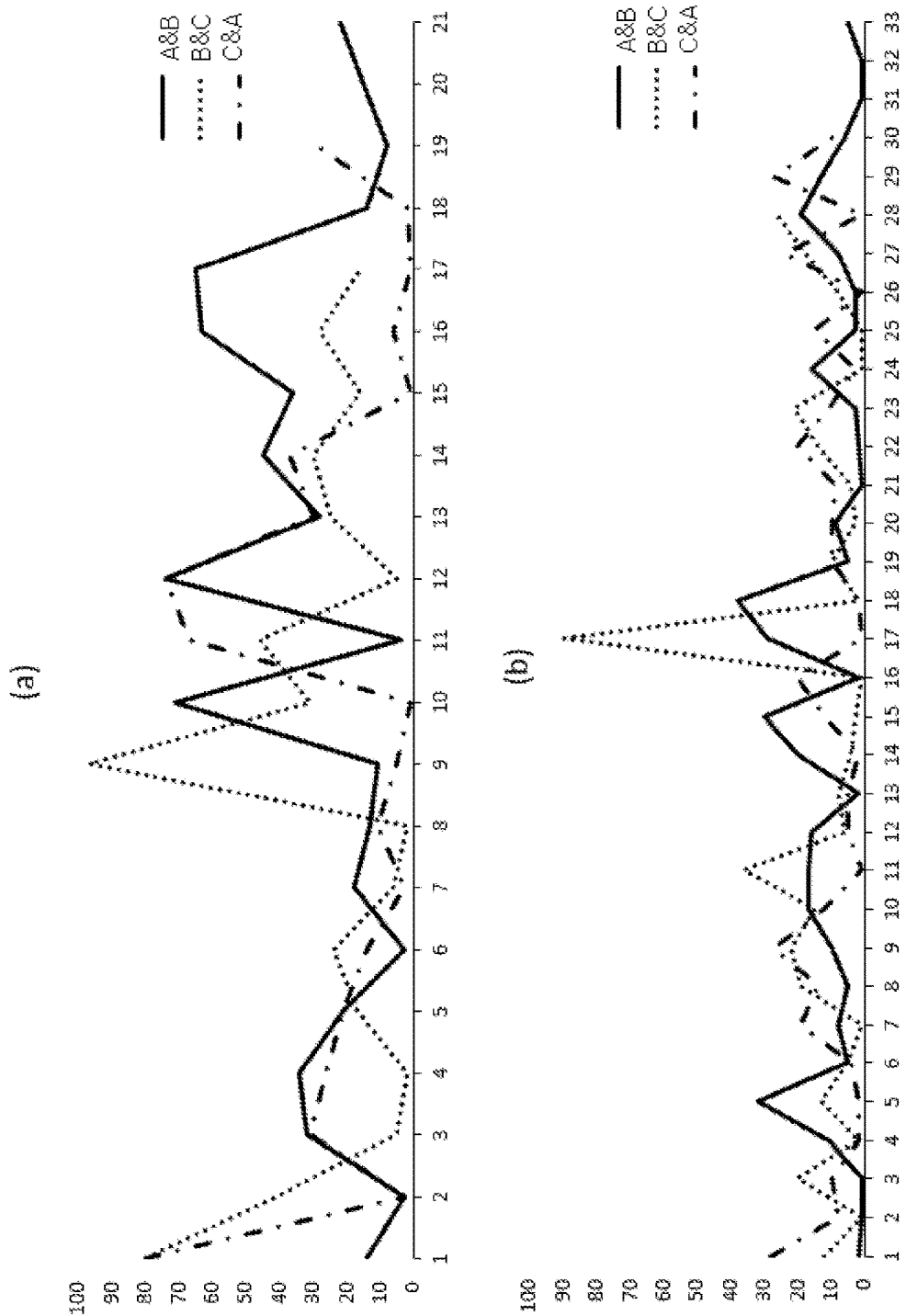
<FIG. 4>

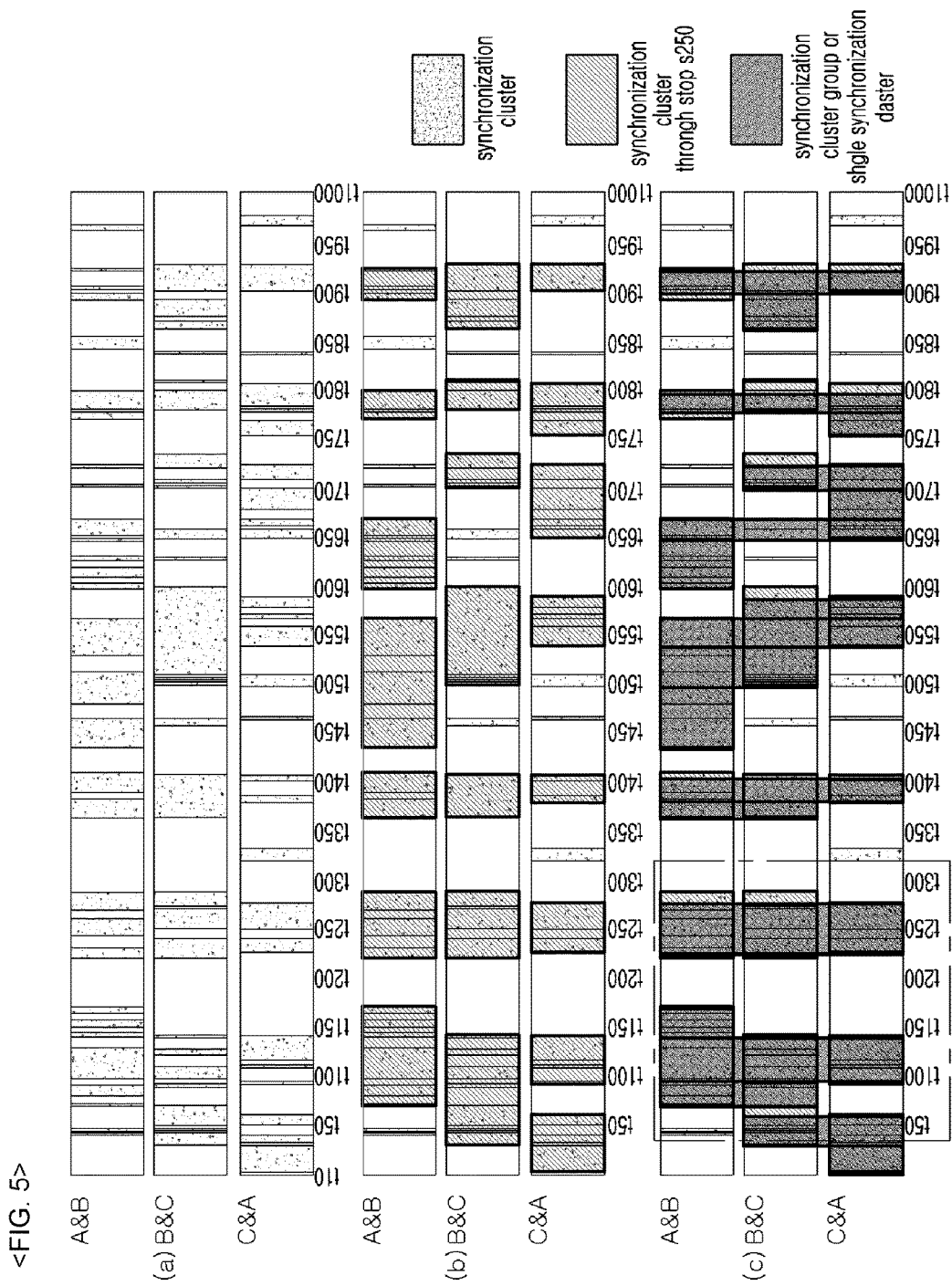
<FIG. 5>

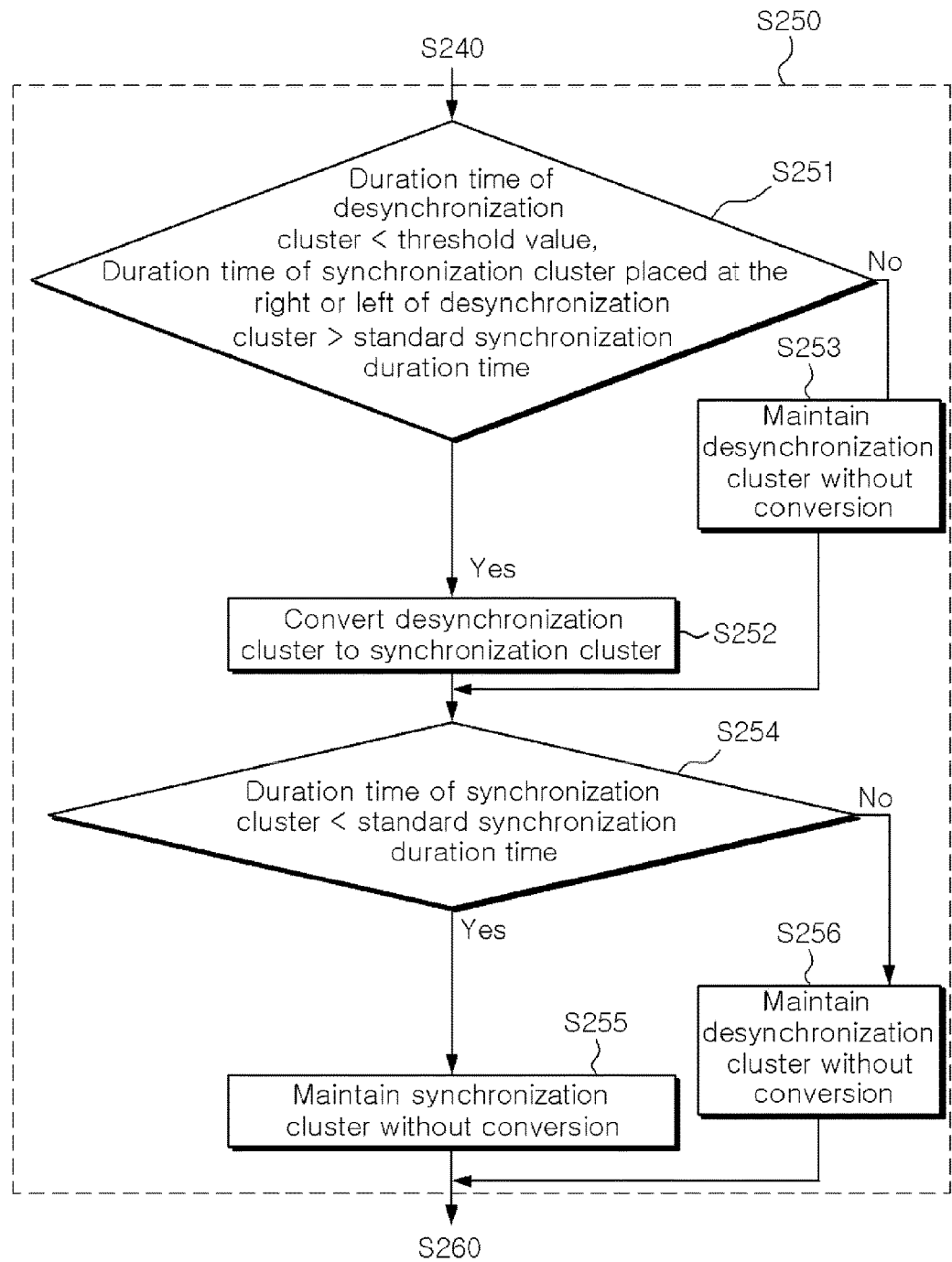

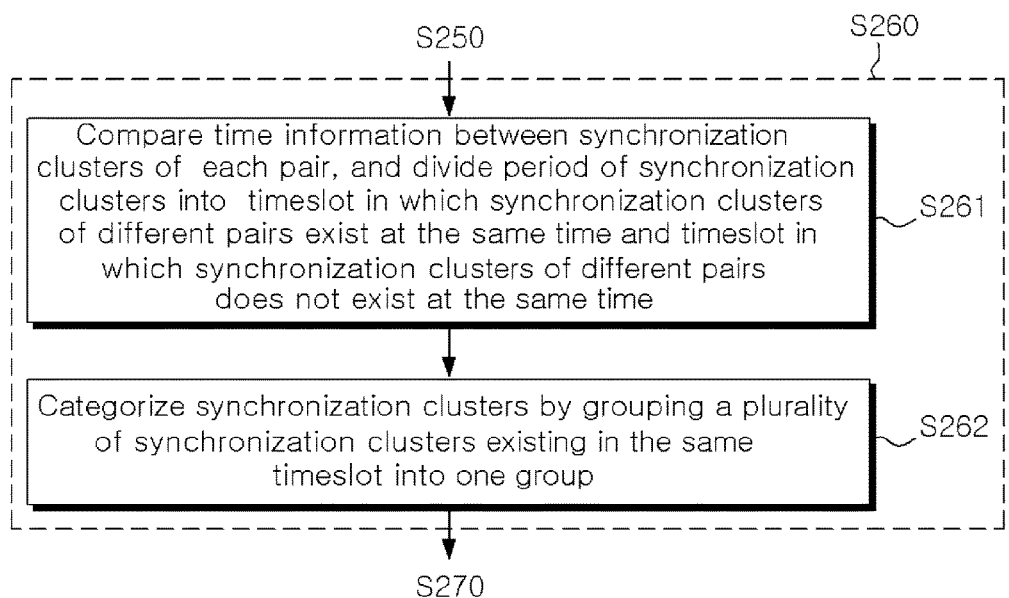

<FIG. 8>
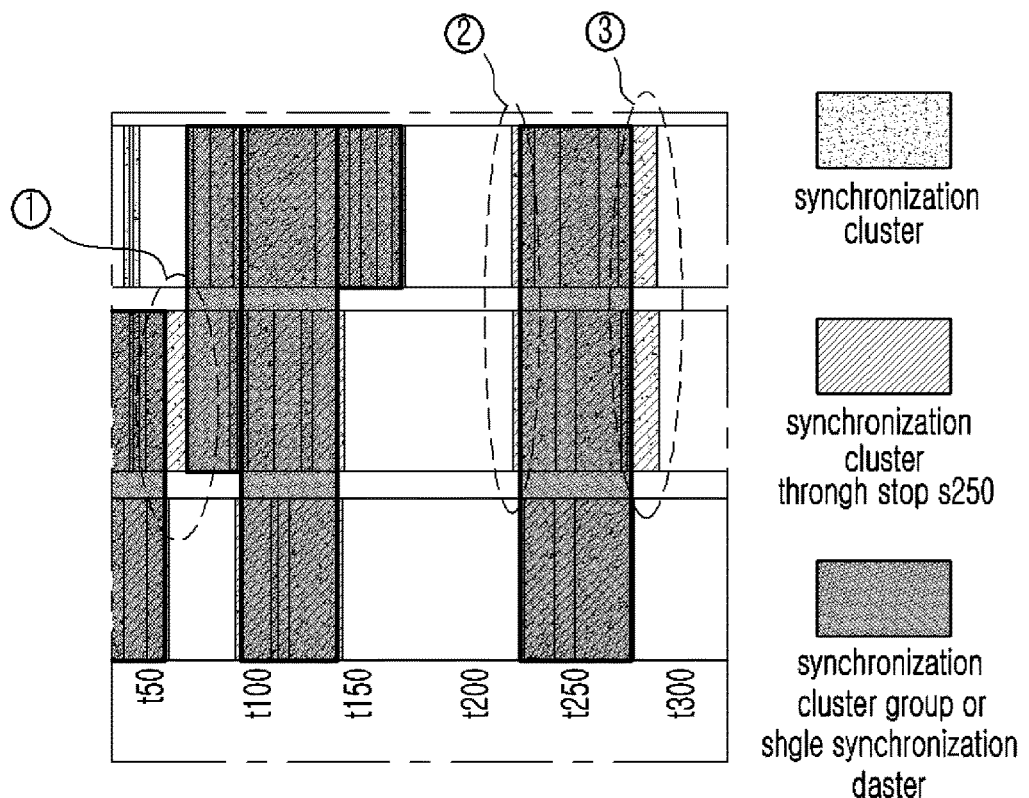

CO-MOVEMENT-BASED AUTOMATIC CATEGORIZATION SYSTEM USING LIFE-LOGGING DATA AND METHOD THEREOF

CROSS-REFERENCE TO RELATED APPLICATION

This application claims priority to and the benefit of Korean Patent Application No. 10-2016-0042373 filed in the Korean Intellectual Property Office on Apr. 6, 2016 the entire contents of which are incorporated herein by reference.

BACKGROUND OF THE INVENTION

(a) Field of the Invention

The present disclosure relates to a system for automatic categorization based on co-movement and method thereof. More particularly, the present disclosure relates to a co-movement-based automatic categorization system using life-logging data, such as users' bio-signals, behavior information, space-time information, consumption of contents information, etc., and a method thereof.

(b) Description of the Related Art

With remarkable development of information and communication technologies, infrastructures for online networking which links the world have been built, and the use of mobile device utilizing the online networking infrastructures has become so common.

Particularly, as the use of social networking service (SNS) has rapidly increased, relationship-building in the online space has been more actively done (Wellman & Gulia, 1999). The relationship-building is a typical function of SNS, and people share their daily lives in the online space through SNS, exchanging feedback comments. The social networking service is a means that enables the relationship among acquaintances to be more closer and that helps people, who pick acquaintance with each other due to similar interests, to build a continuous relationship.

Recently, to reflect these trends, life-logging service recording and analyzing individual daily life in the online space has drawn much attention as one of next generation markets in the field of IT.

Life-logging technologies utilizing information on bio-signals such as cardiac impulses, contents-related information, etc. have been studied, but there is only a little progress at present.

Korean Patent Publication No. 10-1262922 (published on May 9, 2013) discloses a background technique of the present disclosure.

SUMMARY OF THE INVENTION

The present invention has been made in an effort to provide a co-movement-based automatic categorization system using life-logging data, such as users' bio-signals, behavior information, space-time information, consumption of contents information, etc., and a method thereof.

To accomplish the objects of the present disclosure, an exemplary embodiment of the present disclosure provides a co-movement-based automatic categorization method which may include: receiving image data created by photographing a plurality of subjects; detecting movement data including information on subjects' behaviors from the image data; determining whether or not co-movement between the subjects has been done during each predetermined time interval, and generating co-movement clusters in synchronized time sections, and non-co-movement clusters in desynchronized time sections depending on results of determination; if the duration time of a co-movement cluster is shorter than a standard co-movement duration time, converting the co-movement cluster to a non-co-movement cluster; categorizing the co-movement clusters by grouping a plurality of co-movement clusters existing in the same timeslot into one group; and forming a social network with a co-movement cluster group or a single co-movement cluster, and issuing a social identification to the social network.

The generating of the clusters may include: forming a plurality of pairs by matching the subjects one to one; determining whether or not co-movement between the paired subjects has been done during each predetermined time interval; and generating co-movement clusters in synchronized time sections, and non-co-movement clusters in desynchronized time sections depending on results of determination.

The determining of co-movement may include: calculating standard deviation of the movement data of each subject by the predetermined time interval, and standard deviation of the sum of the paired subjects' movement data by the predetermined time interval; comparing the standard deviation of each subject with the standard deviation of the sum by the predetermined time interval; and determining that the co-movement has been done during the corresponding time interval if the standard deviation of each subject is larger than that of the sum, and determining that the paired subjects have been desynchronized during the corresponding time interval if at least one of the standard deviations of the paired subjects is equal to or smaller than that of the sum.

If the duration time of a non-co-movement cluster is shorter than a threshold value and the duration time of a co-movement cluster placed at the left or right of the non-co-movement cluster is longer than the standard co-movement duration time, the co-movement-based automatic categorization method may further include comprising converting the non-co-movement cluster to a co-movement cluster.

The Standard Co-movement Duration Time (SCDT) is calculated by the following equation, $$SCDT = \sqrt{\frac{\sum_{k=1}^{N}\left(CDT_k - \frac{\sum_{k=1}^{N} CDT_k}{N}\right)^2}{N}}$$

where k denotes the index number of a co-movement cluster, N denotes the total number of co-movement clusters, and $CDT_k$ denotes the duration time of the k-th co-movement cluster.

The categorizing of the co-movement clusters may include: comparing time information between the respective co-movement clusters; dividing the duration of the co-movement clusters into a timeslot in which different co-movement clusters exist at the same time and a timeslot in which different co-movement clusters does not exist at the same time; and categorizing the co-movement clusters by grouping a plurality of co-movement clusters existing in the same timeslot into one group.

The forming of the social network and the issuing of the social identification may include: comparing the synchronized period of the co-movement cluster group or one single co-movement cluster with the threshold value; forming the social network with the corresponding co-movement cluster group or co-movement cluster if its synchronized period is equal to or longer than the threshold value; and issuing the social identification to the social network.

The threshold value may be a half of the standard co-movement duration time.

Another exemplary embodiment of the present disclosure provides a co-movement-based automatic categorization system, which may include: an input unit for receiving image data created by photographing a plurality of subjects; a detector for detecting movement data including information on subjects' behaviors from the image data; a cluster generator for determining whether or not co-movement between the subjects has been done during each predetermined time interval, and for generating co-movement clusters in synchronized time sections, and non-co-movement clusters in desynchronized time sections depending on results of determination; a cluster converter for converting the co-movement cluster to a non-co-movement cluster if the duration time of the co-movement cluster is shorter than a standard co-movement duration time; a grouping unit for categorizing the co-movement clusters by grouping a plurality of co-movement clusters existing in the same timeslot into one group; and an ID issuing unit for forming a social network with a co-movement cluster group or a single co-movement cluster, and issuing a social identification to the social network.

According to the present disclosure, co-movement between the subjects can be accurately computed by measuring and analyzing their minute movements, and social service adequate for a social network formed according to the results of computation can be provided.

BRIEF DESCRIPTION OF THE DRAWINGS

FIG. 1 is a schematic view of an automatic categorization system based on co-movement in accordance with an exemplary embodiment of the present disclosure.

FIG. 2 is a flow chart for illustrating an automatic categorization method based on co-movement in accordance with an exemplary embodiment of the present disclosure.

FIG. 3 is a flow chart for illustrating a step S230 of FIG. 2 in further detail.

FIG. 4 is a view for illustrating a co-movement cluster in accordance with an exemplary embodiment of the present disclosure.

FIG. 5 is a view for illustrating a cluster in accordance with an exemplary embodiment of the present disclosure.

FIG. 6 is a flow chart for illustrating a step S250 of FIG. 2 in further detail.

FIG. 7 is a flow chart for illustrating a step S260 of FIG. 2 in further detail.

FIG. 8 is an enlarged view of a part of (c) of FIG. 5.

DETAILED DESCRIPTION OF THE INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive, and like reference numerals designate like elements throughout the specification.

In addition, unless explicitly described to the contrary, the word "comprise" and variations such as "comprises" or "comprising" will be understood to imply the inclusion of stated elements, but not the exclusion of any other elements.

Hereinafter, a co-movement-based automatic categorization system in accordance with an exemplary embodiment of the present disclosure will be described in detail with reference to the accompanying drawings.

FIG. 1 is a schematic view of a co-movement-based automatic categorization system in accordance with an exemplary embodiment of the present disclosure.

Referring to FIG. 1, the co-movement-based automatic categorization system 100 includes an input unit 110, a detector 120, a cluster generator 130, a cluster converter 140, and a grouping unit 150, and an ID issuing unit 160.

First, the input unit 110 receives image data created by photographing a plurality of subjects. The image data refer to moving images created by photographing actual behaviors of the subjects who are having a talk with each other at the same place or mutually exchanging information with the same contents, even though located at different places.

The detector 120 detects movement data including information on subjects' behaviors from the image data. The behavior information is one of life-logging data, and includes changes in facial expression and gesture of the subject, and subject's minute movement such as vibrations of pupils. Here, the life-logging data refer to data in which a user's daily life is recorded, and includes bio-signals, behavior information, space-time information, consumption of contents information, and so on.

The detector 120 may detect data related to each subject's behaviors from the moving images supplied from the input unit 110 by using an algorithm that extracts information on the subjects' behaviors from the moving images.

Next, the cluster generator 130 determines whether or not co-movement between the subjects has been done during each predetermined time interval by using the movement data.

In further detail, the cluster generator 130 forms a plurality of pairs by matching one subject to another one to one, and determines whether or not paired subjects are synchronized with each other during each predetermined time interval. Depending on results of determination, the cluster generator 130 generates co-movement clusters and non-co-movement clusters for each pair, which signify synchronized periods and desynchronized periods, respectively.

Meanwhile, to determine whether co-movement between the subjects has been done during each predetermined time interval, the cluster generator 130 may calculate standard deviation of the movement data of each subject by the predetermined time interval, and standard deviation of the sum of the subjects' movement data by the predetermined time interval.

Then, the cluster generator 130 compares the standard deviation of each subject and the standard deviation of the sum by the predetermined time interval, and if the standard deviation of each subject is larger than that of the sum, determines that the co-movement has been done during the corresponding time interval, and if the standard deviation of each subject is equal to or smaller than that of the sum, determines that the paired subjects have been desynchronized during the corresponding time interval.

The cluster generator 130 generates the co-movement clusters which signify the synchronized periods, and the non-co-movement clusters which signify the desynchronized periods, according to the results of determination.

Next, the cluster converter 140, if the synchronized period of the co-movement cluster is shorter than a standard co-movement duration time, converts the corresponding co-movement cluster to a non-co-movement cluster.

More concretely, if the duration time of the generated non-co-movement cluster is shorter than a threshold value and the duration time of the co-movement cluster placed at the left or right of the non-co-movement cluster is longer than the standard co-movement duration time, the cluster converter 140 may convert the non-co-movement cluster to a co-movement cluster. Here, the threshold value may be a half of the standard co-movement duration time.

Next, the grouping unit 150 categorizes the co-movement clusters by grouping a plurality of co-movement clusters existing in the same timeslot into one group.

In detail, the grouping unit 150 categorizes the co-movement clusters by first comparing time information between the respective co-movement clusters, dividing the duration of the co-movement clusters into a time in which different co-movement clusters exist at the same time and a time in which different co-movement clusters does not exist at the same time, and grouping all the co-movement clusters existing in the same timeslot into one group.

Next, the ID issuing unit 160 issues a social identification to a group consisting of a plurality of co-movement clusters, or to a single co-movement cluster.

In this case, the ID issuing unit 160 compares the synchronized period of the co-movement cluster group or one single co-movement cluster with the threshold value, if it is equal to or longer than the threshold value, forms a social network with the corresponding co-movement cluster group or co-movement cluster, and then issues the social identification to the social network.

According to the exemplary embodiment of the present disclosure, the co-movement-based automatic categorization system 100 can be implemented as an apparatus.

Hereinafter, an automatic categorization method based on co-movement according to the exemplary embodiment of the present disclosure is described with reference to FIG. 2 to FIG. 7. FIG. 2 is a flow chart for illustrating the automatic categorization method based on co-movement in accordance with the exemplary embodiment of the present disclosure.

As shown in FIG. 2, at step S210, the co-movement-based automatic categorization system 100 receives image data created by photographing a plurality of subjects, and at step S220 detects movement data including information on subjects' behaviors from the image data.

Then, at step S230, the co-movement-based automatic categorization system 100 determines whether or not co-movement between the subjects has been done during each predetermined time interval by using the movement data. FIG. 3 is a flow chart for illustrating the step S230 of FIG. 2 in further detail, and the step S230 is described below in detail with FIG. 3.

First, at step S231, the co-movement-based automatic categorization system 100 forms a plurality of pairs by matching one subject to another one to one. For example, if the subjects are three (A, B, and C), the number of cases of 1 to 1 matching is three, (A & B), (B & C), and (C & A). That is, three pairs are formed. If the subjects are four, six pairs are formed, and if five, ten pairs.

Next, at step S232, the co-movement-based automatic categorization system 100 calculates standard deviation of the movement data of each subject by the predetermined time interval, and standard deviation of the sum of the subjects' movement data by the predetermined time interval.

More concretely, the co-movement-based automatic categorization system 100 may divide the movement data of each subject according to the predetermined time interval. For example, it is assumed that the total duration time of the movement data for each subject is 1000 seconds. In this case, if the predetermined time interval is 1 second, the movement data is divided into 1000, and if 2 seconds, the movement data is divided into 500.

Hereinafter, sections of the movement data divided depending on the predetermined time interval will be represented as cells. That is, when the movement data with the total duration time of 1000 seconds are divided by the predetermined time interval of 1 second, it can be expressed that the movement data consist of 1000 cells. The respective cells of the movement data may be classified with index numbers.

The co-movement-based automatic categorization system 100 may calculate the standard deviation of each section (that is, each cell) divided by the predetermined time interval. For example, it is assumed that the number of subjects is three (A, B and C) and the movement data having the total duration time of 1000 seconds are divided by the predetermined time interval of 1 second. In this case, since the movement data for A, B and C are respectively divided into 1000 cells, the co-movement-based automatic categorization system 100 calculates the standard deviation for 3000 cells in total, 1000 cells for each of A, B, and C.

Further, after having summed the movement data of the subjects forming each pair, the co-movement-based automatic categorization system 100 calculates the standard deviation of the sum for each predetermined time interval. Concretely, the co-movement-based automatic categorization system 100 sums the movement data of two subjects forming each pair, divides the summed movement data by the predetermined time interval, and calculates the standard deviation of each of the divided sections, that is, the standard deviation of each cell.

For example, in the case in which the number of subjects is three (A, B and C) and the movement data are divided by the predetermined time interval of 1 second, the movement data are summed with respect to each of the pairs (A & B), (B & C), and (C & A), the summed movement data are divided by the time interval of 1 second, and the standard deviation of each cell is calculated.

For example, if the data duration time of 1000 seconds, the predetermined time interval of 0.1 second, three subjects A, B, and C are given, the standard deviations can be computed as follows.

TABLE 1

|   | Time (sec.) | | | | | | | | |
|---|---|---|---|---|---|---|---|---|---|
| Standard deviation | 0~1 | 1~2 | 2~3 | 3~4 | 4~5 | 5~6 | ... | 998~999 | 999~1000 |
| A | 12 | 15 | 16 | 17 | 15 | 14 | ... | 16 | 15 |
| B | 13 | 19 | 19 | 15 | 15 | 16 | ... | 12 | 14 |
| C | 13 | 13 | 17 | 11 | 17 | 19 | ... | 13 | 16 |
| Sum of A & B | 14 | 17 | 15 | 13 | 14 | 13 | ... | 18 | 13 |
| Sum of B & C | 16 | 15 | 17 | 11 | 11 | 16 | ... | 12 | 16 |
| Sum of C & A | 12 | 11 | 15 | 19 | 17 | 17 | ... | 13 | 17 |

Under the condition like Table 1, the standard deviations for 6000 cells in total can be calculated.

Next, at every time interval, the co-movement-based automatic categorization system 100 compares the standard deviation of each subject and the standard deviation of the sum at step S233.

More concretely, at every time interval, the co-movement-based automatic categorization system 100 compares the standard deviation of the sum of the movement data of each pair consisting of two paired subjects with the standard deviation of movement data of each paired subject.

For example, if three subjects (A, B and C) are given as in Table 1, at the respective time sections from a section of 0 to 1 second to a section of 999 to 1000 seconds, the co-movement-based automatic categorization system 100 compares the standard deviation of the movement data related to the subject A with the standard deviation of the sum of the movement data related to the subject A and movement data related to the subject B, compares the standard deviation of the movement data related to the subject B with the standard deviation of the sum of the movement data related to the subject A and movement data related to the subject B, and compares the standard deviation of the movement data related to the subject B with the standard deviation of the sum of the movement data related to the subject B and movement data related to the subject C. Further, the co-movement-based automatic categorization system 100 compares the standard deviation of the movement data related to the subject C with the standard deviation of the sum of the movement data related to the subject B and movement data related to the subject C, compares the standard deviation of the movement data related to the subject C with the standard deviation of the sum of the movement data related to the subject C and movement data related to the subject A, and compares the standard deviation of the movement data related to the subject A with the standard deviation of the sum of the movement data related to the subject C and movement data related to the subject A. 6000 comparison results are thus created.

As a comparison result of the step S233, if at least one of the standard deviations of the respective subjects is equal to or smaller than the standard deviation of the sum, at step S234, the co-movement-based automatic categorization system 100 determines that the corresponding subjects have been desynchronized at the corresponding time section. In contrast, if at least one of the standard deviations of the respective subjects is larger than the standard deviation of the sum, at step S235, the co-movement-based automatic categorization system 100 determines that the corresponding subjects have been synchronized at the corresponding time section.

Referring to Table 1, at the time section of 0 to 1 second, the standard deviation of A is 12, the standard deviation of C is 13, and the standard deviation of the sum of C and A is 12. In this case, since the standard deviation of C is larger than that of the sum of C and A but the standard deviation of A is equal to that of the sum of C and A, it is determined that the corresponding cell has been desynchronized. This corresponds to the step S234. In contrast, at the time section of 2 to 3 seconds, the standard deviation of A is 16, the standard deviation of B is 19, and the standard deviation of the sum of A and B is 15. In this case, since all of the standard deviations of A and B are larger than that of the sum of A and B, it is determined that the corresponding cell has been synchronized. This corresponds to the step S235.

Whether or not the co-movement has been done at each time section of Table 1 is determined through the procedure as described above, and the results of determination are given in the following Table 2. In Table 2, "1" refers to a synchronized cell, and "0" refers to a desynchronized cell

TABLE 2

|   | Time (sec.) | | | | | | | | |
|---|---|---|---|---|---|---|---|---|---|
| Pair | 0~1 | 1~2 | 2~3 | 3~4 | 4~5 | 5~6 | ... | 998~999 | 999~1000 |
| A&B | 0 | 0 | 1 | 1 | 1 | 1 | ... | 0 | 1 |
| B&C | 0 | 0 | 0 | 1 | 1 | 0 | ... | 0 | 0 |
| C&A | 1 | 1 | 1 | 0 | 0 | 0 | ... | 0 | 0 |

Next, depending on the determination results of the steps S234 and S235, the co-movement-based automatic categorization system 100 generates the co-movement clusters in synchronized periods and the non-co-movement clusters in desynchronized periods for each pair at step S236.

From the steps S233 to S235, each pair has any one of two kinds of result values (that is, a co-movement value or a non-co-movement value) at each time section. If the result values are arranged over time, one or more continuous sections having the co-movement value or the non-co-movement value are formed. In this case, a section where one or more synchronized cells are continuously formed is called a co-movement cluster, and a section where one or more desynchronized cells are continuously formed is called a non-co-movement cluster. Each of the co-movement clusters and non-co-movement clusters may have its own index to be distinguished from others.

Table 3 shows the co-movement clusters and non-co-movement clusters obtained from Table 2.

TABLE 3

|   | Time (sec.) | | | | | | | | |
|---|---|---|---|---|---|---|---|---|---|
| Pair | 0~1 | 1~2 | 2~3 | 3~4 | 4~5 | 5~6 | ... | 998~999 | 999~1000 |
| A&B | 0 | 0 | 1 | 1 | 1 | 1 | ... | 0 | 1 |
| B&C | 0 | 0 | 0 | 1 | 1 | 0 | ... | 0 | 0 |
| C&A | 1 | 1 | 1 | 0 | 0 | 0 | ... | 0 | 0 |

In Table 3, the section where the synchronized cells are continuously formed is the co-movement cluster, and the section where the desynchronized cells are continuously formed is the non-co-movement cluster. As shown in Table 3, each pair may include a plurality of co-movement clusters and a plurality of non-co-movement clusters.

FIG. 4 is a view for illustrating a co-movement cluster in accordance with an exemplary embodiment of the present disclosure. In FIG. 4, graphs of (a) show variations of the co-movement clusters, which are measured when three subjects have a talk in the same space, and graphs of (b) show variations of the co-movement clusters, which are measured when three subjects are supplied with the same contents.

In FIG. 4, the horizontal axis represents the number of co-movement clusters and the vertical axis represents the duration time of the co-movement clusters. From FIG. 4(a), it can be seen that the number of the co-movement clusters of A&B is 21, B&C is 17, and C&A is 19, and the created co-movement clusters have various duration time. Also, from FIG. 4(b), it can be seen that the number of the co-movement clusters of A&B is 33, B&C is 28, and C&A is 30, and the created co-movement clusters have various duration time. From these results, it can be seen that the duration time of emotional interchange between the subjects having a talk at the same place is longer than the duration time of emotional interchange when they are supplied with the same contents.

FIG. 5 is a view for illustrating a cluster in accordance with an exemplary embodiment of the present disclosure. In FIG. 5, (a) shows the co-movement and non-co-movement clusters for each pair of three subjects. In (a), shaded portions in each pair represent the co-movement clusters and not shaded portions represent the non-co-movement clusters.

Next, at step S250, the co-movement-based automatic categorization system 100 compares the standard co-movement duration time with the duration time of each co-movement cluster and the duration time of each non-co-movement cluster, and based on results of comparison, converts some co-movement clusters to non-co-movement clusters, and some non-co-movement clusters to co-movement clusters.

Here, the Standard Co-movement Duration Time (SCDT) serves as a threshold value used for determining whether the co-movement between the subjects has been done, and may be calculated by the following Equation 1.

$$SCDT = \sqrt{\frac{\sum_{k=1}^{N}\left(CDT_k - \frac{\sum_{k=1}^{N} CDT_k}{N}\right)^2}{N}}$$ ⟨Equation 1⟩ where k denotes the index number of a co-movement cluster, N denotes the total number of co-movement clusters, and $CDT_k$ denotes the duration time of the k-th co-movement cluster.

The reason that the standard co-movement duration time is used in the present disclosure is to accurately determine whether or not the co-movement between the subjects has been done by removing a noise from the movement data. For example, in the case in which the cluster converting process is not performed by using the standard co-movement duration time, even a co-movement cell of 1 second should be determined to have been synchronized. However, the co-movement for 1 second is very short time. That is, it is nearly impossible that emotional interchange between the subjects is done in such a short time. Therefore, it is reasonable that whether or not the co-movement has been done is determined based on the minimum-possible emotional exchange time. In the exemplary embodiment of the present disclosure, accordingly, the standard co-movement duration time is set in consideration of it.

Hereinafter, the step S250 according to the exemplary embodiment of the present disclosure is described in detail with reference to FIG. 6. FIG. 6 is a flow chart for illustrating the step S250 of FIG. 2 in further detail.

First, at step S251, the co-movement-based automatic categorization system 100 compares the duration time of the desynchronization cluster with the threshold value, and compares the duration time of the co-movement cluster, which is placed at the left or right of the desyncronization cluster, with the standard co-movement duration time.

Concretely, the co-movement-based automatic categorization system 100 compares the duration time of each of a plurality of non-co-movement clusters included in each pair with the threshold value. In this case, the threshold value may be set to have a half of the standard co-movement duration time.

In addition, the co-movement-based automatic categorization system 100 compares the duration time of the co-movement cluster, which is placed at the left or right of each of the plurality of desyncronizations, with the standard co-movement duration time. Here, when the clusters created in each pair are arranged over time, a co-movement cluster which is placed at the left of a specific desyncronization cluster is a cluster positioned just before a time point that the corresponding non-co-movement exists, whereas a co-movement cluster which is placed at the right of the corresponding desyncronization cluster is a cluster positioned right after the time point that the corresponding non-co-movement exists.

The step S251 is performed to remove a noise from the data. In the case in which the duration time of non-co-movement is too short, it is difficult to determine the cause of such a situation is because emotional exchange between the subjects has stopped or because a new non-co-movement cluster has been created for the duration time of co-movement due to the noise. Accordingly, for the accurate date computation, the co-movement-based automatic categorization system 100 removes the noise from the data by performing the step S251.

As the results of comparison of the step S251, if the duration time of the created non-co-movement cluster is shorter than the threshold value or the duration time of the co-movement cluster placed at the left or right of the non-co-movement cluster is longer than the standard co-movement duration time, at step S252, the co-movement-based automatic categorization system 100 converts the non-co-movement cluster to a co-movement cluster.

In contrast, if the duration time of the created non-co-movement cluster is equal to or longer than the threshold value and the duration time of the co-movement cluster placed at the left or right of the non-co-movement cluster is equal to or shorter than the standard co-movement duration time, at step S253, the co-movement-based automatic categorization system 100 maintains the non-co-movement cluster as it is, not converting it to a co-movement cluster.

For example, it is assumed that the threshold value is 9.7 seconds and the standard co-movement duration time is 19.4 seconds. If the duration time of the non-co-movement cluster is 9 seconds, the duration time of the co-movement cluster placed at the left of the non-co-movement cluster is 12 seconds, and the duration time of the co-movement cluster placed at the right of the non-co-movement cluster is 20 seconds, this case corresponds to the step S252. Accordingly, the co-movement-based automatic categorization system 100 converts the corresponding non-co-movement cluster with the duration time of 9 seconds to a co-movement cluster.

In contrast, if the duration time of the non-co-movement cluster is 9 seconds, the duration time of the co-movement cluster placed at the left of the non-co-movement cluster is 12 seconds, and the duration time of the co-movement cluster placed at the right of the non-co-movement cluster is 15 seconds, this case corresponds to the step S253. Accordingly, the co-movement-based automatic categorization system 100 maintains the non-co-movement cluster as it is, not converting it to a co-movement cluster.

Further, even in the case of the non-co-movement cluster with the duration time of 14 seconds, the step S253 should be performed. Accordingly, the co-movement-based automatic categorization system 100 maintains the non-co-movement cluster as it is without a conversion.

Next, at step S254, the co-movement-based automatic categorization system 100 compares the duration time of the co-movement cluster with the standard co-movement duration time. The co-movement cluster of this step may be different to one created in the step S240. This is because the co-movement cluster of this step may be a cluster converted from the non-co-movement cluster through the step S251 or S252.

As a comparison result, if the duration time of the co-movement cluster is shorter than the standard co-movement duration time, the co-movement-based automatic categorization system 100 converts the corresponding co-movement cluster to a non-co-movement cluster at step S255.

In contrast, if the duration time of the co-movement cluster is equal to or longer than the standard co-movement duration time, at step 256, the co-movement-based automatic categorization system 100 maintains the corresponding co-movement cluster as it is without a conversion.

The clusters shown in (a) of FIG. 5 are converted through the step S250, and result values of those conversions are shown in (b) of FIG. 5. In FIG. 5(b), hatched portions refer to the co-movement clusters gone through the step S250. Relatively portions of the hatched portion without a shadow refer to parts that the non-co-movement clusters have been converted to the co-movement clusters through the steps S251 to S253, and shaded portions without hatching refer to parts that the co-movement clusters have been converted to the non-co-movement clusters through the steps S254 to S256.

Next, at step S260, the co-movement-based automatic categorization system 100 categorizes the co-movement clusters by grouping a plurality of co-movement clusters existing in the same timeslot into one group.

Hereinafter, the step S260 according to the exemplary embodiment of the present disclosure is described in detail with reference to FIG. 7. FIG. 7 is a flow chart for illustrating the step S260 of FIG. 2 in further detail.

First, at step S261, the co-movement-based automatic categorization system 100 compares time information between the co-movement clusters, and divides the period of the co-movement clusters into a time in which different co-movement clusters exist at the same time and a time in which different co-movement clusters does not exist at the same time.

In further detail, as shown in (b) of FIG. 5, final co-movement clusters of three pairs may be temporally overlapped with each other. The co-movement-based automatic categorization system 100 extracts the timeslot in which the co-movement clusters of different pairs exist at the same time, and the timeslot in which only one co-movement cluster exist.

Then, at step S262, the co-movement-based automatic categorization system 100 categorizes the co-movement clusters by grouping a plurality of co-movement clusters existing in the same timeslot into one group. After the step S262, only one co-movement cluster or only one group consisting of a plurality of co-movement clusters remains in the timeslot in which the co-movement clusters respectively existed.

Next, at step S270, the co-movement-based automatic categorization system 100 forms a social network with a plurality of co-movement cluster groups or a single co-movement cluster, and issues a social identification to the social network.

More specifically, the co-movement-based automatic categorization system 100 compares the synchronized period of each co-movement cluster group or the single co-movement cluster with the threshold value, forms the social network with each co-movement cluster group or the single co-movement cluster if it is equal to or longer than the threshold value, and issues the social identification to the social network.

FIG. 8 is an enlarged view of a part of (c) of FIG. 5. In this figure, quadrangles outlined with a bold line refer to the co-movement cluster groups and the single co-movement cluster, to which the social identifications are issued. That is, when the synchronized period of the co-movement cluster group or the single co-movement cluster is equal to or longer than the threshold value, each quadrangle outlined with the bold line gets its own social identification.

In FIG. 8, however, the portions represented by ①, ② and ③ does not get the social identifications because their synchronized period is shorter the threshold value. In detail, the social identification isn't issued to the portion represented by ① since the synchronized period of the single co-movement cluster is shorter than the threshold value. In the portions represented by ② and ③, the co-movement cluster group is formed because there is a timeslot in which a plurality of co-movement clusters simultaneously exist, but the social identification isn't issued to those portions since the synchronized period of the co-movement cluster group is shorter the threshold value.

Meanwhile, to issue the social identification to the co-movement cluster is similar to issue the social identification to the pair of the corresponding co-movement cluster, and also similar to issue the social identification to the subjects included in the pair.

The social identification issued by the co-movement-based automatic categorization system 100 according to the exemplary embodiment of the present disclosure is used for providing social networking service. Since that the same social identification has been issued to the subjects several times means that co-movement between the subjects has been frequently done, the co-movement-based automatic categorization system 100 may recommend a social meeting such as a club on the basis of formed social network information. Furthermore, since that the same social identification has been rarely issued means adaptability of the subjects, the co-movement-based automatic categorization system 100 may provide service capable of enhancing the adaptability of the subjects to the meeting.

According to the exemplary embodiment of the present disclosure, co-movement between the subjects can be accurately computed by measuring and analyzing their minute movements, and social service adequate for a social network formed according to the results of computation can be provided.

Example embodiments have been disclosed herein and although specific terms are employed, they are used and are to be interpreted in a generic and descriptive sense only and not for purpose of limitation. In some examples, as would be apparent to one of ordinary skill in the art as of the filing of the present application, features, characteristics and/or elements described in connection with a particular embodiment may be used singly or in combination with features, characteristics and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A co-movement-based automatic categorization method used for issuing a social identification using a co-movement-based automatic categorization system, the system including at least one or more units, a detector, a cluster generator, and a cluster converter which being executed by a processor using an algorithm associated with a non-transitory storage device, the method comprising:
    receiving image data created by photographing a plurality of subjects;
    detecting movement data including information on subjects' behaviors from the image data;
    determining whether or not co-movement between the plurality of subjects has been done during a time interval, and generating co-movement clusters in synchronized time sections, and non-co-movement clusters in desynchronized time sections depending on results of the determination;
    in response to detection of a duration time of a co-movement cluster being shorter than a Standard Co-movement Duration Time (SCDT), converting the co-movement cluster to a non-co-movement cluster;
    categorizing the co-movement clusters into a group by grouping a plurality of co-movement clusters existing in a same timeslot; and
    forming a social network with a co-movement cluster group or a single co-movement cluster, and issuing a social identification to the social network.

2. The method of claim 1, wherein the generating of the clusters includes:
    forming a plurality of pairs by matching one or more subjects to another one or more subjects;
    further determining whether or not the matched subjects are synchronized with each other during the time interval; and
    generating co-movement clusters in synchronized time sections, and non-co-movement clusters in desynchronized time sections depending on results of the further determination.

3. The method of claim 2, wherein the determining of co-movement includes:
    calculating standard deviation of movement data of each of the matched subjects by the time interval, and standard deviation of a sum of movement data of the plurality of pairs by the time interval;
    comparing the standard deviation of each of the matched subjects with the standard deviation of the sum of the plurality of pairs;
    determining whether or not co-movement has been done during the time interval in response to detection of the standard deviation of each of the matched subjects being larger than that of the standard deviation of the sum of the plurality of pairs; and
    determining that the matched subjects have been desynchronized during the time interval in response to detection of at least one of the standard deviation of each of the matched subjects being equal to or smaller than that of the standard deviation of the sum of the plurality of pairs.

4. The method of claim 2, wherein the categorizing of the co-movement clusters includes:
    comparing time information between the respective co-movement clusters;
    dividing a duration of the co-movement clusters into a timeslot in which different co-movement clusters exist at the same time and a timeslot in which different co-movement clusters do not exist at the same time; and
    categorizing the co-movement clusters by grouping a plurality of co-movement clusters existing in the same timeslot into one group.

5. The method of claim 4, wherein the forming of the social network and the issuing of the social identification include:
    comparing a synchronized period of the co-movement cluster group or one single co-movement cluster with a threshold value;
    forming the social network with the co-movement cluster group or co-movement cluster in response to detection of its synchronized period being equal to or longer than the threshold value; and
    issuing the social identification to the social network.

6. The method of claim 1, in response to detection of a duration time of a first non-co-movement cluster being shorter than a threshold value and a duration time of a co-movement cluster placed at the left or right of the first non-co-movement cluster being longer than the standard co-movement duration time, further comprising converting the first non-co-movement cluster to a co-movement cluster.

7. The method of claim 6, wherein the threshold value is half of the standard co-movement duration time.

8. The method of claim 1, wherein the Standard Co-movement Duration Time (SCDT) is calculated by the following equation, $$SCDT = \sqrt{\frac{\sum_{k=1}^{N}\left(CDT_k - \frac{\sum_{k=1}^{N} CDT_k}{N}\right)^2}{N}}$$

where k denotes an index number of a co-movement cluster, N denotes a total number of co-movement clusters, and $CDT_k$ denotes a duration time of the k-th co-movement cluster.

9. A co-movement-based automatic categorization system, the system including at least one or more units, a detector, a cluster generator, and a cluster converter which being executed by a processor using an algorithm associated with a non-transitory storage device, the system comprising:

an input unit for receiving image data created by photographing a plurality of subjects;

a detector for detecting movement data including information on subjects' behaviors from the image data;

a cluster generator for determining whether or not co-movement between the plurality of subjects has been done during a time interval, and for generating co-movement clusters in synchronized time sections, and non-co-movement clusters in desynchronized time sections depending on results of the determination;

a cluster converter for converting a co-movement cluster to a non-co-movement cluster in response to detection of a duration time of the co-movement cluster being shorter than a standard co-movement duration time;

a grouping unit for categorizing the co-movement clusters into a group by grouping a plurality of co-movement clusters existing in a same timeslot; and an ID issuing unit for forming a social network with a co-movement cluster group or a single co-movement cluster, and issuing a social identification to the social network.

10. The system of claim 9, wherein the cluster generator forms a plurality of pairs by matching at least one or more subjects to another one or more subjects, further determines whether or not the matched subjects are synchronized with each other during the time interval, and generates co-movement clusters in synchronized time sections, and non-co-movement clusters in desynchronized time sections depending on results of the further determination.

11. The system of claim 10, wherein the cluster generator calculates standard deviation of movement data of each of the matched subjects by the time interval, and standard deviation of a sum of movement data of the plurality of pairs by the time interval, compares the standard deviation of each of the matched subjects with the standard deviation of the sum of the plurality of pairs, determines whether or not co-movement has been done during the time interval in response to detection of the standard deviation of each of the matched subjects being larger than that of the standard deviation of the sum of the plurality of pairs, and determines that the matched subjects have been desynchronized during the time interval in response to detection of at least one of the standard deviation of each of the matched subjects being equal to or smaller than that of the standard deviation of the sum of the plurality of pairs.

12. The system of claim 10, wherein the grouping unit compares time information between the respective co-movement clusters, divides a duration of the co-movement clusters into a timeslot in which different co-movement clusters exist at the same time and a timeslot in which different co-movement clusters do not exist at the same time, and categorizes the co-movement clusters by grouping a plurality of co-movement clusters existing in the same timeslot into one group.

13. The system of claim 12, wherein the ID issuing unit compares a synchronized period of the co-movement cluster group or one single co-movement cluster with a threshold value, forms the social network with the co-movement cluster group or co-movement cluster in response to detection of its synchronized period being equal to or longer than the threshold value, and issues the social identification to the social network.

14. The system of claim 9, in response to detection of a duration time of a first non-co-movement cluster being shorter than a threshold value and a duration time of a co-movement cluster placed at the left or right of the first non-co-movement cluster being longer than the standard co-movement duration time, the cluster converter converts the first non-co-movement cluster to a co-movement cluster.

15. The system of claim 14, wherein the threshold value is half of the standard co-movement duration time.

16. The system of claim 9, wherein the Standard Co-movement Duration Time (SCDT) is calculated by the following equation, $$SCDT = \sqrt{\frac{\sum_{k=1}^{N}\left(CDT_k - \frac{\sum_{k=1}^{N} CDT_k}{N}\right)^2}{N}}$$

where k denotes an index number of a co-movement cluster, N denotes a total number of co-movement clusters, and $CDT_k$ denotes a duration time of the k-th co-movement cluster.

* * * * *